United States Patent
Zivkovic et al.

(10) Patent No.: US 11,718,131 B2
(45) Date of Patent: Aug. 8, 2023

(54) TREAD FOR A HEAVY GOODS VEHICLE TIRE

(71) Applicant: COMPAGNIE GENERALE DES ETABLISSEMENTS MICHELIN, Clermont-Ferrand (FR)

(72) Inventors: Tony Zivkovic, Clermont-Ferrand (FR); Arnaud Larregain, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 273 days.

(21) Appl. No.: 16/474,203

(22) PCT Filed: Dec. 19, 2017

(86) PCT No.: PCT/FR2017/053701
§ 371 (c)(1),
(2) Date: Jun. 27, 2019

(87) PCT Pub. No.: WO2018/122496
PCT Pub. Date: Jul. 5, 2018

(65) Prior Publication Data
US 2020/0180363 A1    Jun. 11, 2020

(30) Foreign Application Priority Data
Dec. 28, 2016   (FR) ...................... 1663454

(51) Int. Cl.
*B60C 11/12*   (2006.01)
*B60C 11/03*   (2006.01)
*B60C 11/13*   (2006.01)

(52) U.S. Cl.
CPC ...... *B60C 11/1281* (2013.01); *B60C 11/0323* (2013.01); *B60C 11/1259* (2013.01);
(Continued)

(58) Field of Classification Search
CPC ............ B60C 11/1281; B60C 11/0323; B60C 11/1259; B60C 11/13; B60C 2011/1338; B60C 2200/06
See application file for complete search history.

(56) References Cited

U.S. PATENT DOCUMENTS 3,115,919 A  * 12/1963  Roberts ............... B60C 11/1281
                                                    152/209.17
3,570,571 A  *  3/1971  Riches .................. B60C 11/042
                                                    152/209.21
(Continued)

FOREIGN PATENT DOCUMENTS

EP    1 015 261    7/2000
EP    2 323 858    5/2011
(Continued)

*Primary Examiner* — Justin R Fischer
*Assistant Examiner* — Philip N Schwartz
(74) *Attorney, Agent, or Firm* — Cozen O'Connor

(57) ABSTRACT

Tread (1) for a heavy-duty vehicle tire having a total thickness corresponding to the thickness of material to be worn away during running, this tread having, in the new state, a tread surface (10) intended to come into contact with a roadway when running. The tread comprises at least one hidden cavity (2) forming a new groove opening onto the tread surface after a predetermined amount of partial wear. Cavity (2) comprises two opposite lateral walls (21, 22) connected together by bottom (23) radially towards the inside and by crown part (24) radially towards the outside. Crown part (24) is provided with a plurality of fine grooves (25) extending radially towards the outside from crown part (24) delimiting the cavity and extending in a direction that makes an angle at least equal to 40 degrees with the main direction of cavity (2).

12 Claims, 2 Drawing Sheets

(52) U.S. Cl.
CPC ....... *B60C 11/13* (2013.01); *B60C 2011/0355* (2013.01); *B60C 2011/1295* (2013.01); *B60C 2011/1338* (2013.01); *B60C 2200/06* (2013.01)

(56) References Cited

U.S. PATENT DOCUMENTS

| | | | |
|---|---|---|---|
| 2005/0224151 A1 | 10/2005 | De Benedittis | |
| 2006/0005905 A1* | 1/2006 | Croissant | B60C 11/13 |
| | | | 152/154.2 |
| 2012/0227883 A1* | 9/2012 | Audigier | B60C 11/0323 |
| | | | 152/209.18 |
| 2017/0246820 A1* | 8/2017 | Lawson | B60C 11/1281 |

FOREIGN PATENT DOCUMENTS

| | | | | |
|---|---|---|---|---|
| EP | 2 483 087 | | 8/2012 | |
| FR | 2 940 185 | | 6/2010 | |
| FR | 2 971 732 | | 8/2012 | |
| JP | 2003211922 A | * | 7/2003 | ......... B60C 11/1218 |
| WO | WO-2014001069 A1 | * | 1/2014 | ......... B60C 11/1218 |
| WO | WO-2015080771 A | * | 6/2015 | ........... B29C 43/021 |
| WO | WO 2015/114129 | | 8/2015 | |

* cited by examiner

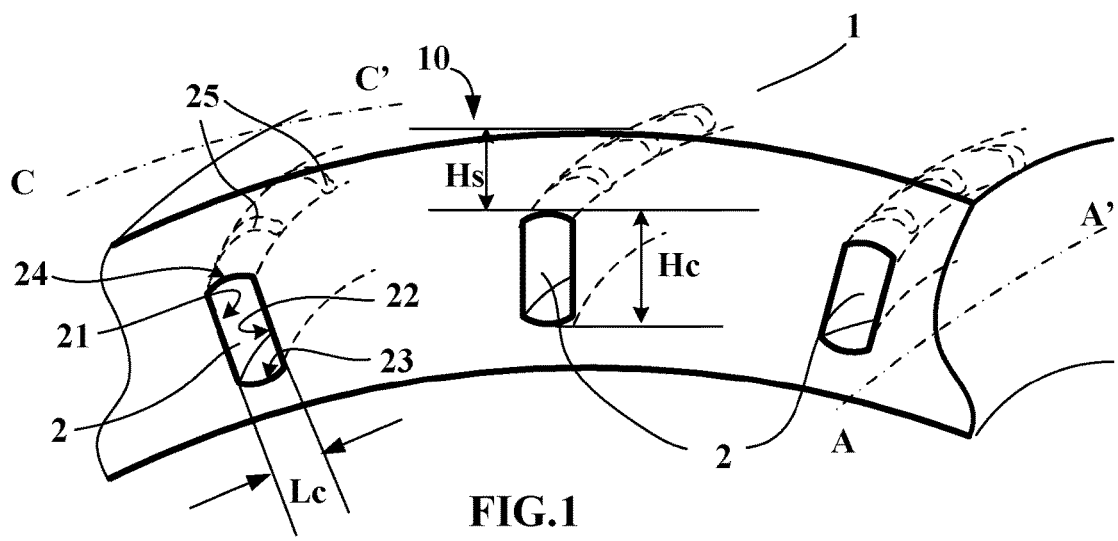
FIG.1
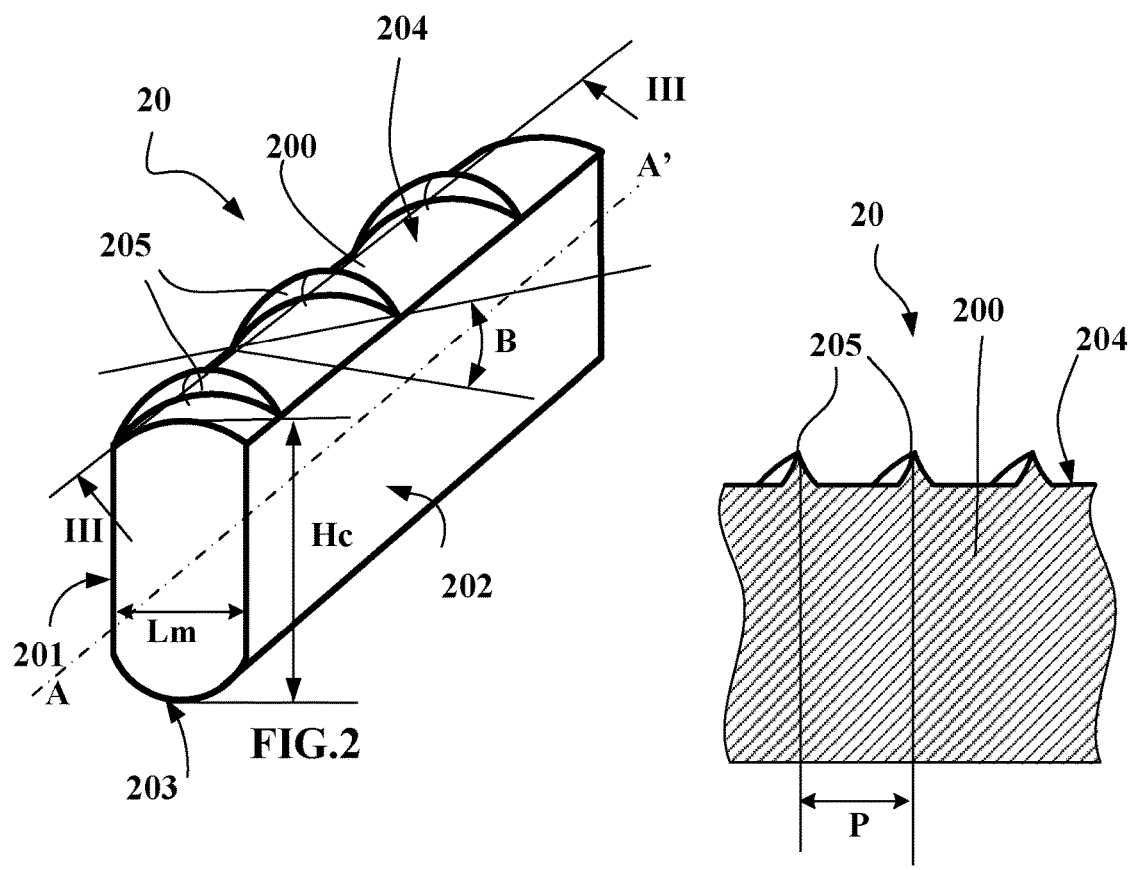
FIG.2
FIG.3

TREAD FOR A HEAVY GOODS VEHICLE TIRE

RELATED APPLICATIONS

This is a U.S. National Phase Application under 35 USC 371 of International Application PCT/FR2017/053701 filed on Dec. 19, 2017.

This application claims the priority of French application no. 1663454 filed Dec. 28, 2016, the entire content of which is hereby incorporated by reference.

FIELD OF THE INVENTION

The invention relates to treads for tires and more particularly to the tread pattern designs of these treads, and to the tires provided with such treads which have a lasting ability to drain away water present on the roadway in times of wet weather, these treads having improved running performance.

BACKGROUND OF THE INVENTION

As is known, wet-weather driving conditions require the most rapid possible elimination of the water between the tread of each tire and the roadway so as to ensure that the tread makes contact with the roadway. Water that is not pushed over the front of the tire flows partially along the grooves and sipes formed in the tire tread, whether these grooves and sipes are oriented in the circumferential direction or the transverse direction or in an oblique direction.

Definitions

A cut means any cavity or void made notably by moulding in a tread, this cut extending both in a main direction, which is the direction of flow of the water in the cut in wet weather, and into the depth of the tread.

A groove means here a cut that opens onto a tread surface intended to be in contact with the roadway, this cut having a mean width such that the walls of material delimiting it are never in contact with one another under the normal service conditions of the tire.

A sipe means here a thin cut having a mean width that is small and such that, under normal tire service conditions, the walls of material delimiting it can come at least partially into contact with one another when that sipe is in the contact patch in which the tire is in contact with the roadway.

A hidden groove means a cavity or channel formed at least partially under the tread surface in the new state, this hidden cavity being intended to form a new groove that is open onto the tread surface after a predetermined amount of partial wear. A hidden groove is delimited by two opposite lateral walls, these two lateral walls being connected together by a lower part forming a bottom connecting the two walls radially towards the inside and by an upper part in the continuation of these walls radially towards the outside. Into this upper part, a sipe connecting the hidden groove to the tread surface in the new state can open.

The thickness of material to be worn away means the thickness of tread that can be worn away during running before the legal tread wear limit, which can be indicated by wear indicators formed notably in the grooves, is reached.

In the present description, the terms radial or radially are used to indicate a direction which, when considered on the tire, is a direction perpendicular to the axis of rotation of the tire whereas, when considered on a tread alone, it corresponds to the direction of the thickness of said tread.

Moreover, the term circumferential is used to indicate a direction which corresponds to a direction tangential to any circle centred on the axis of rotation of the tire. This same direction corresponds to the longitudinal direction of the tread, the latter being formed in the manner of a flat strip before it is incorporated at the time of manufacture of a tire.

Whatever the category of tire (that is to say whether it is a tire to be fitted to a passenger vehicle or to a heavy-duty vehicle intended to carry heavy loads), the tread needs to have a standing-water drainage performance that always remains above a minimum performance referred to as the safe performance. Accordingly, and given that the tread gradually wears away, progressively reducing the cross-sectional areas of the grooves and consequently the ability of these grooves to remove a volume of liquid, it is commonplace to produce grooves that open onto the tread surface in the new state and continue into the thickness of the tread down to at least a level that corresponds to a legal limit requiring the tread to be withdrawn.

The disadvantage of creating a plurality of grooves that open onto the tread surface of a tread in the new state is that it reduces the amount of tread material for a given width of tread and consequently has an appreciable impact on the stiffness of the tread and the wearing performance. As a result, in order to address the loadings experienced by the tread during running, a person skilled in the art needs to compensate for these reductions in stiffness by any means at their disposal, notably by adapting the internal structure of the tire, something that is, of course, not without its own impact on the cost price of the tire itself. These reductions in stiffness can also adversely affect the wear rate, the evenness of this wear, and some of the expected aspects of performance during running.

Moreover, an increase in rolling resistance has been observed, which manifests itself in an appreciable increase in fuel consumption of vehicles fitted with such tires, as a result of an increase in hysteresis losses associated with the cycles of deformation of the rubbery material of which the tread is made.

The document EP2483087-B1 proposes forming in a tread grooves that have the particular feature of opening discontinuously onto the tread surface in the new state. This groove can be considered to be a groove that is wavy in the thickness of the tread, opening regularly onto the tread surface. This type of groove that is wavy in the direction of the thickness of a tread can be formed either in the circumferential direction or in any other direction. As described in that publication, this type of groove is continuous in the initial state (which corresponds to the new state of the tread) so that, when driving on a roadway covered in standing water, water can be picked up in those parts of the groove that open onto the tread surface as they enter the contact patch, the water thus picked up being drained along the wavy groove beneath the tread surface. The liquid thus picked up is then ejected outside the contact patch under the effect of centrifugal forces. That same document describes the possibility, like prior-art tread pattern designs, of making connections between at least two wavy grooves of this type.

Other documents exist, such as, in particular, EP 2323858 B1, which recommend the formation of two hidden voids formed entirely beneath the tread surface of the tread in the new state. That type of tire makes it possible to renew the drainage volume when the tread has reached a predetermined level of wear.

In all these solutions, it has been found that, before the formation of new grooves, localized wear can occur, this wear being able to be described as irregular since it does not arise uniformly over the entire tread. This can be explained by the fact that the portion of material radially between each hidden cavity and the tread surface is less stiff than the rest.

The document EP1015261 B1 proposed a solution for causing the virtually instantaneous appearance of a new groove from a hidden cavity. That means consists in the presence of two small cut grooves formed in the upper part of the cavity, these small cut grooves being continuous in the main direction of the hidden cavity. These small cut grooves extend radially towards the tread surface beyond the upper wall delimiting the cavity. When the level of wear reaches these cut grooves, the upper part of the cavity is instantaneously detached from the tread, thereby opening up the groove. However, while this arrangement makes it possible to rapidly form a new groove, it does not make it possible to avoid irregular wear before the upper part is completely detached from the tread. Moreover, this arrangement can cause a number of difficulties in demoulding the tire while it is being manufactured.

Reference is also made to the following prior-art documents: FR 2971732 A1, WO 2015/114129 A1, FR 2940185 A1, US 2005/224151 A1.

SUMMARY OF THE INVENTION

One object of the present invention seeks to propose is to provide a solution to this the problem of irregular wear that can occur before a new groove is formed by the opening of a channel underlying the tread surface.

To this end, a one aspect of the invention is directed to a tread for a heavy-duty vehicle tire having a thickness corresponding to the thickness of material to be worn away during running. This tread has, in the new state, a tread surface intended to come into contact with a roadway when a tire provided with this tread is running. This tread surface changes with wear.

The tread according to an embodiment of the invention comprises at least one hidden cavity intended to form a new groove opening onto the tread surface after a predetermined amount of partial wear. This hidden cavity comprises two opposite lateral walls that are spaced apart from one another by a distance corresponding to the width of the new groove, these lateral walls being connected together by a lower part forming a bottom radially towards the inside and by an upper part radially towards the outside. This tread is such that the upper part delimiting the hidden cavity is provided with a plurality of fine grooves, the depth of which extends radially towards the outside from the upper part delimiting the cavity, these fine grooves extending in a mean direction that makes an angle at least equal to 40 degrees with the main direction of the cavity.

The main direction of a cavity corresponds to the direction of flow of a liquid inside this cavity when it is open onto the tread surface and forms a new groove; it is generally the direction of the largest dimension of the cavity.

Advantageously, the maximum depth of the fine grooves is chosen depending on the height Hc of the hidden cavity, this height being able to be fixed depending on the thickness of tread material to be worn away. When the height Hc of the hidden cavity increases, the maximum depth of the fine grooves increases. Preferably, the maximum depth of the fine grooves is at least equal to 1 mm and at most equal to 5 mm.

Preferably, these fine grooves have a depth at most equal to 30% of the thickness of material to be worn away. Preferably, these fine grooves have a depth at least equal to 5% of the thickness of material to be worn away and at most equal to 30% of the same thickness.

In one variant of the invention, the fine grooves formed in the upper part delimiting the hidden cavity are oriented at an angle close or equal to 90 degrees to the main direction of the hidden cavity.

In another variant having a sipe continuing the channel towards the tread surface, the fine grooves formed in the upper wall delimiting the hidden cavity continue on the lateral walls delimiting said sipe. Preferably, the height over which these fine grooves extend along the walls delimiting the sipe is at most equal to 5 mm and even more preferably at most equal to 3 mm. In one variant of the invention, the fine grooves extend as far as at least one lateral wall of the hidden cavity and continue on this lateral wall over a height at most equal to 5 mm and even more preferably at most equal to 3 mm. This latter variant can advantageously be combined with the arrangement in which the fine grooves continue on the walls delimiting the sipe.

In another variant of the invention, the upper part of the cavity comprises, on each side of the sipe, a flat face inclined at an angle greater than zero and at most equal to 35 degrees, this angle being measured with respect to a direction parallel to the transverse direction.

By virtue of this invention, it is possible to locally modify the stiffness of the tread in the vicinity of each hidden cavity in a phase of wear fairly close to the formation of a new groove. This local modification of the stiffness ensures better wearing behaviour and it is thus possible to obtain a more regular wear profile of the tread before the appearance of a new groove compared with the same tread without small grooves as defined.

Further features and advantages of the invention will become apparent from the description given below with reference to the appended drawings which show, by way of non-limiting example, an embodiment of the subject matter of the invention.

BRIEF DESCRIPTION OF THE FIGURES

FIG. 1 shows a partial view of the edge of a tread comprising a plurality of channels formed entirely beneath the tread surface in the new state, these channels being oriented transversely, i.e. parallel to the axis of rotation of the tire provided with this tread;

FIG. 2 shows a moulding element intended to mould a channel as shown in FIG. 1;

FIG. 3 shows the element from FIG. 2 in cross section on a plane III-III;

DETAILED DESCRIPTION OF THE FIGURES

Figure 4:
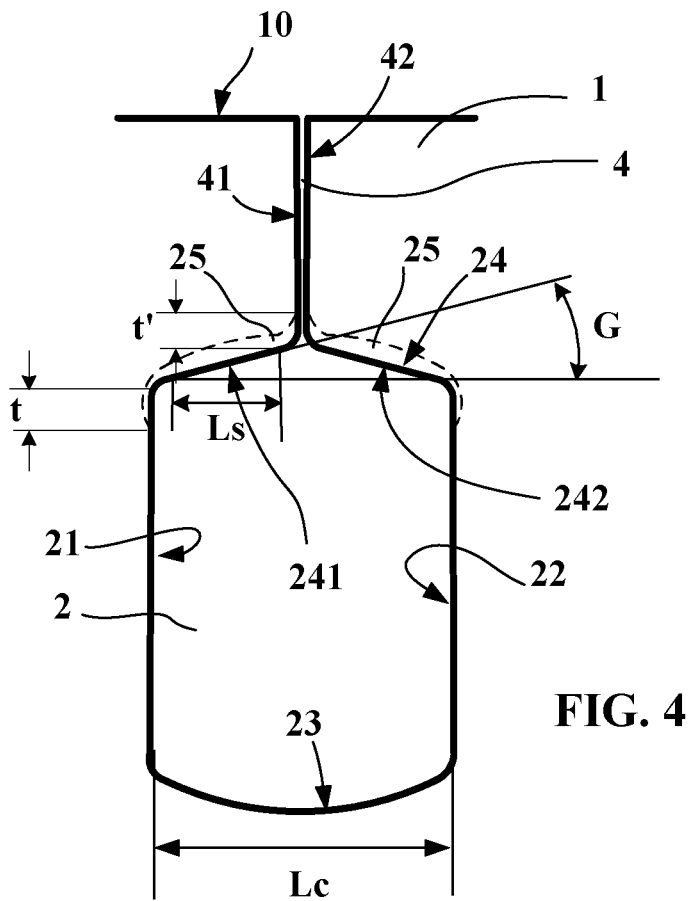
FIG. 4 shows a variant of a channel according to an embodiment of the invention that is continued towards the tread by a sipe and comprises a plurality of small incisions formed in the upper part of the channel.

The first variant illustrating the invention is shown in FIG. 1 and relates to a tread 1 of a tire for a heavy-duty vehicle, this tread 1 having, in the new state, a tread surface 10 intended to come into contact with a roadway. This tread 1 comprises hidden channels 2 under the tread surface 10 that are intended, after the tread has been partially worn away, to form new grooves that open onto the tread surface. In the present case, these channels 2 are oriented transversely, that is to say in a direction AA' corresponding to the transverse or axial direction of a tire provided with this tread. The transverse direction is coincident with the axis of rotation of the tire. As can be seen in FIG. 1, these channels 2 open towards the outside at the lateral edges of the tread 1. Each channel 2 comprises two opposite lateral walls 21, 22, the distance between these lateral walls defining the width Lc of the channel. These lateral walls 21 and 22 are connected together by a channel bottom 23 in the innermost part and by a crown part 24 in the part closest to the tread surface 10.

Located in each of the channels 2 and in the crown part 24 are a plurality of fine grooves 25 with a maximum depth equal to 4 mm, these fine grooves 25 being oriented obliquely with respect to the main direction of the channels 2. In the present case, the main direction of the channels corresponds to the transverse or axial direction on the tread (indicated by the line AA' in FIG. 1).

Each channel 2 is situated beneath the tread surface 10 of the tread 1 at a distance Hs and has a total height Hc. In the present case, these two heights Hs and Hc are substantially the same. The thickness of tread material to be worn away corresponds more or less to the sum of the heights Hs and Hc.

Each of these channels 2 can be moulded by virtue of a moulding element as shown in part in FIG. 2.

Apparent on the moulding element 20 shown in FIG. 2 is a main body 200, this main body 200 having two lateral faces 201, 202 connected by a part 203 that moulds the bottom of the channel and a crown part 204 that moulds the upper part of the channel, this crown part 204 being intended to be situated between the channel and the tread surface of the tread while the tread is being moulded. The maximum distance between the crown part and the bottom is equal to the height Hc of the channel moulded with this moulding element 20.

Apparent in the crown part 204 of the moulding element are a plurality of protuberances 205 that are distributed across the entire width of this crown part 204 and at a mean orientation that makes an angle B equal to 45 degrees with the main direction of the moulding element in this example; the main direction of the moulding element corresponds to the direction of the length of the element that is indicated by a direction AA' in the drawing. In the present case, this direction is coincident with the transverse direction of the tread. Of course, these channels 2 can be moulded in oblique directions with respect to the transverse direction.

These protuberances 205 have a maximum height equal to 2 mm and are intended to mould fine grooves with a maximum width equal to 1.5 mm and a maximum depth equal to 2 mm, these fine grooves opening into the cavity moulded by the body 200 after the tread has been moulded. These protuberances 205 are spaced apart by a mean distance P of between one and five times the maximum width Lm of the moulding element 20. In the present case, the mean distance P is equal to the maximum width Lm separating the parallel faces 201, 202 of the moulding element.

The fine grooves moulded by this moulding element are not cut grooves oriented in the main direction of the channel so as to cause the appearance of a new groove, as is described in the document EP1015261 B1, but rather grooves that modify the local stiffness across the entire width of the crown part of the channel. By virtue of this modification, it is possible to improve to make wear more regular.

FIG. 3 shows a cross section of the moulding element 20 from FIG. 2 on a section plane, the line of which is indicated by the line in FIG. 2. Visible in this cross section is the crown part 204 having protuberances 205 for moulding fine grooves in the tread, these protuberances being spaced apart by a distance P.

FIG. 4 shows a variant of the invention in which a channel 2 is continued towards the tread surface 10 by a sipe 4. In this variant, the crown part 24 of the channel 2 is subdivided on either side of the sipe 4 into two crown parts 241, 242. Each of these crown parts is inclined at an angle G equal to 15 degrees in the example, so as to form an angle of 150 degrees therebetween. Also formed in each of these crown parts 241, 242 are a plurality of transversely oriented fine grooves 25. These fine grooves 25 make an angle of 90 degrees with the main direction of the hidden cavity corresponding to the direction perpendicular to the plane of FIG. 4. These fine grooves 25 extend somewhat over the walls 41, 42 delimiting the sipe 4 and over the lateral faces 21, 22 delimiting the cavity 2.

The combination of the presence of a plurality of fine grooves 25 and the inclination of the crown parts 241, 242 is particularly effective on the wearing surface.

Figure 5:
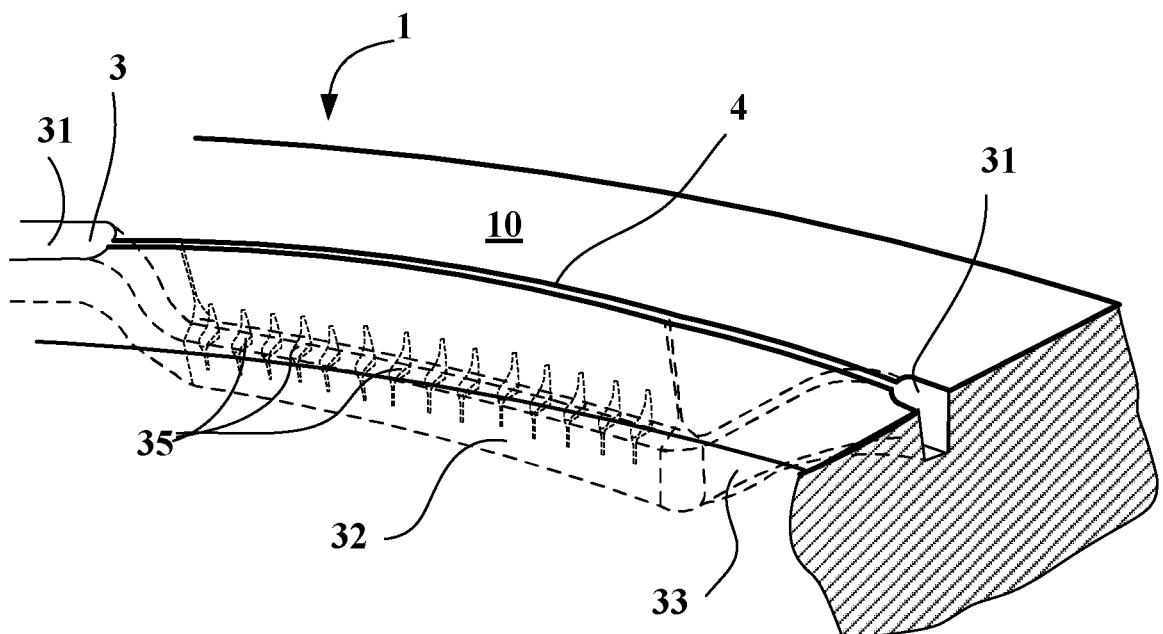
FIG. 5 shows a variant of the invention applied to a wavy groove having a succession of parts that are open onto the tread surface in the new state and hidden parts.

The third variant, shown in FIG. 5, relates to a tread 1 for a heavy-duty vehicle tire of size 315/70R22.5.

This tread has, in its thickness, at least one groove referred to as wavy, this wavy groove 3 having an alternation of groove parts 31 that open onto the tread surface 10 in the new state and hidden cavities 32 that are intended to open onto the tread surface after a predetermined amount of wear in order to form new grooves. These open groove parts 31 and hidden cavity parts 32 are connected together by connecting parts 33 that ensure continuity of the flow of fluids in the wavy groove in the new state, this flow taking place in the main direction of the groove. This type of wavy groove is described in the patent EP2483087-B1, to which reference is made in particular for the figures.

The maximum width of the hidden cavity 32 is equal to 5 mm and its height is equal to 6 mm.

In order to make it easier to mould and demould this wavy groove 3, a sipe 4 is also formed that extends between each hidden cavity 32 and each connecting part 33 for connecting to the tread surface 10 in the new state. The sipe 4 has a width equal to 0.6 mm and is delimited by walls that are able to come into at least partial contact with one other under use conditions.

Each hidden groove 32 comprises two opposite lateral walls, these lateral walls being connected together by a lower part forming a bottom radially on the inside and by an upper part radially on the outside. The upper part is divided into two parts that are continued by walls delimiting the sipe 4.

In order to improve the wearing surface radially above the hidden cavities and thus to achieve more regular wear over the entire tread surface, a plurality of fine grooves 35 are formed in the upper part of each hidden cavity, said fine grooves 35 being oriented in the present case so as to make an angle of 90 degrees with the main direction of the groove 3, this main direction corresponding to the direction of the flow of water in the groove 3 in wet weather.

These fine grooves indent the walls delimiting the sipe 4 over a small height (1.5 mm). Furthermore, these same fine grooves 35 continue over a small height (1.5 mm) on the walls delimiting each hidden cavity 32 widthwise. These fine grooves 35 are disposed parallel to one another at a spacing equal to 6 mm.

After the tread has been partially worn away, and before the fine grooves 35 appear at the tread surface of the tread, the absence of material associated with the presence of these fine grooves causes localized flexibility in the vicinity of the cavity, making it possible to ensure more regular wear.

The invention is not limited to the examples described and various modifications can be made thereto by a person skilled in the art without departing from the scope as defined in the claims.

The invention claimed is:

1. A tread for a heavy-duty vehicle tire having a total thickness corresponding to the thickness of material to be worn away during running,
   the tread having, in the new state, a tread surface adapted to come into contact with a roadway when running,
   the tread comprising at least one axially extending hidden cavity configured to form a new groove opening onto the tread surface after a predetermined amount of partial wear, the hidden cavity comprising two opposite lateral walls connected together by a bottom radially towards the inside and by a crown part radially towards the outside,
   a sipe that extends from the tread surface to the at least one axially extending hidden cavity, the sipe dividing the crown part radially towards the outside;
   wherein the at least one axially extending hidden cavity open towards an outside at respective lateral edges of the tread,
   wherein the crown part of the hidden cavity is provided with a plurality of fine grooves, the depth of which extends radially towards the outside from the crown part delimiting the cavity, said fine grooves extending in a direction that makes an angle at least equal to 40 degrees with the axially extending main direction of the cavity, the main direction of a cavity corresponding to the direction of flow of a liquid inside this cavity when it is open onto the tread surface and forms a new groove,
   wherein the fine grooves are spaced apart from one another between one and five times a width of the hidden cavity; and
   at least one circumferentially extending groove having alternating open grooves and hidden circumferential portions configured to form a new circumferential groove opening onto the tread surface after a predetermined amount of partial wear, wherein the hidden circumferential portions have axially extending fine grooves, wherein a first axial end of each axially extending fine groove extends radially towards the tread surface and a second axial end of each axially extending fine groove, axially opposite the first axial end, extends radially away from the tread surface.

2. The tread according to claim 1, wherein the fine grooves formed in the crown part delimiting the hidden cavity have a maximum depth at least equal to 1 mm and at most equal to 5 mm.

3. The tread according to claim 1, wherein the fine grooves formed in the crown part delimiting the hidden cavity are oriented at an angle substantially equal to 90 degrees to the main direction of the hidden cavity.

4. The tread according to claim 1, wherein the fine grooves continue on a part of the walls delimiting the sipe.

5. The tread according to claim 4, wherein the height over which said fine grooves extend along the sipe is at most equal to 3 mm.

6. The tread according to claim 1, wherein the fine grooves extend as far as a lateral wall of the hidden cavity and are continued on this lateral wall over a height at most equal to 3 mm.

7. The tread according to claim 1, wherein respective lateral ends of the at least one axially extending hidden cavity are radially inclined towards the tread surface.

8. The tread according to claim 7, wherein the respective lateral ends of the at least one axially extending hidden cavity are configured as grooves that open onto the tread surface.

9. The tread according to claim 1, wherein a maximum width of the hidden cavity is equal to 5 mm and a height of the hidden cavity is equal to 6 mm.

10. The tread according to claim 1, wherein the hidden cavity is situated beneath the tread surface at a first distance and the hidden cavity has a height, wherein the first distance and the height are equal.

11. The tread according to claim 1, wherein each of the crown parts is inclined at an angle of 15 degrees.

12. The tread according to claim 1, wherein the fine grooves have a depth at least equal to 5% of the thickness of material to be worn away and at most equal to 30% of the thickness of material to be worn away.

* * * * *